Dec. 31, 1929.     W. A. SCOTT ET AL     1,741,589
CHARCOAL CHEWING GUM
Filed June 27, 1927
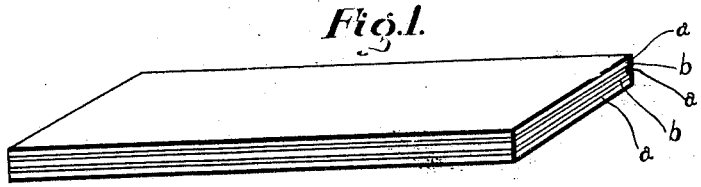
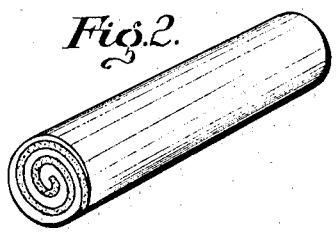
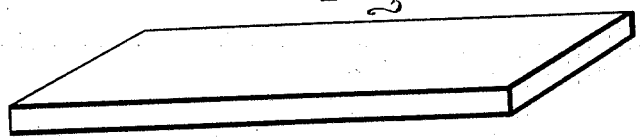
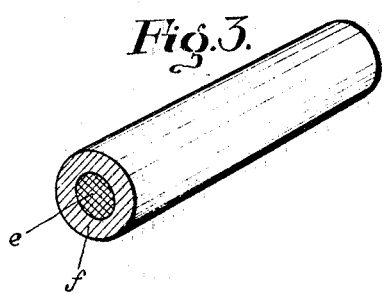
INVENTOR.
ATTORNEY.

Patented Dec. 31, 1929

1,741,589

UNITED STATES PATENT OFFICE

WALTER A. SCOTT, OF RIVER FOREST, ILLINOIS, AND KENNETH A. PROUTY, OF HERMOSA BEACH, CALIFORNIA

CHARCOAL CHEWING GUM

Application filed June 27, 1927. Serial No. 201,807.

Our invention is a composition of matter comprising charcoal and some substance of a consistency suitable for forming the base of chewing gum. The relative proportions of these substances depend to some extent upon the consistency of the substance used as a gum base, but the proportion of charcoal is always relatively large as the function of the charcoal in the mixture is its action as an aid to digestion. We are aware that it has heretofore been proposed to use granulated, as distinguished from powdered, charcoal in admixture with chicle or other gum in an amount equal to about one-fourth of one per cent, by weight of the complete gum mixture. Such use of charcoal is described in the patent granted to W. E. Williams, February 11, 1913, No. 1,052,872, and the patentee states that he uses the minute amount of charcoal mentioned (one fourth of one percent of the complete mixture) for the purpose of shortening the chicle, and he explains that he prefers to use charcoal for this purpose instead of starch and digestible fats. The patentee states that the charcoal must not be too finely divided because in a state of fine subdivision the charcoal will make the gum black or dark which he considers an objection, and he also cautions against using too much charcoal which would make the gum too short. A similar admixture of various substances with rubber or other gums is described in Patent 98,304, granted to W. F. Semple December 28, 1869. Semple describes the admixture of "non-adhesive earths" with rubber to form "an agreeable chewing-gum" and also to subserve the purpose of a dentifrice. This patentee explains that rubber itself is too hard to be used as a chewing-gum but that in combination with non-adhesive earths it "may be rendered capable of kneading into any shape under the teeth". Semple used the earths, charcoal and other substances for the same purpose as Williams, namely to shorten the gum, i. e. to impart to it a consistency such that it would be agreeable to chew, or as Semple says, "rendered capable of kneading" by the teeth. Semple also refers to the incidental function as a dentifrice of the admixed substance.

Our purpose in adding charcoal to the gum base is not to shorten it or improve its consistency for chewing, but to obtain the inherent effect of the charcoal itself as a therapeutic agent. We do not add charcoal in the minute amounts heretofore described as the maximum that can be used as such minute amounts would be insufficient to effect any useful purpose as an aid to digestion. On the contrary we add a proportion of powdered charcoal far in excess of the small amounts which heretofore it has been believed could not be exceeded without so changing the consistency of the compound as to make it useless as a chewing-gum. It is true, as stated by the patentee, Williams, that the addition of a relatively large amount of powdered charcoal to chicle has the effect of destroying that consistency which is necessary in a chewing-gum. Large amounts of powdered charcoal make the chicle hard, "too short", as described by Williams, and difficult to reduce in the mouth to a mass sufficiently yielding to be agreeably chewed. The principal purpose of our invention is to form an admixture of a chewing-gum base with charcoal in relatively large proportions, and at the same time avoid hardening or "shortening" the product. It is only by providing means for preventing such hardening or "shortening" that a sufficient amount of charcoal to be of any value as an aid to digestion can be added to the gum base. We have discovered that this result may be accomplished either by using a gum base that initially has properties that will counteract the objectionable effect of the addition of a relatively large proportion of charcoal, or by combining the charcoal and gum base in the manner described below.

In the drawings:

Figure 1 is a perspective view of a piece of chewing-gum of the shape now commonly made and embodying our invention, the gum base and charcoal being in alternate layers.

Figure 2 is a perspective view of a piece of charcoal chewing-gum of a different shape but with the charcoal and gum base in alternate layers.

Figure 3 is a sectional view of another embodiment of the invention in which also the charcoal and gum base are in segregated masses.

Figure 4 represents a piece of charcoal chewing-gum in which the two ingredients are intimately mixed instead of being in segregated masses as in the forms shown in the other views.

The base most commonly used for chewing-gum is chicle or a gum prepared from the juice obtained from a tree similar to that from which chicle is obtained, this latter gum being generally referred to as "chicle substitute". Intimate admixture of a relatively large proportion of powdered charcoal with chicle or chicle substitute produces the hardening or excessive "shortening" effect above referred to, but we have found that if the charcoal and gum are formed into a coherent body with the charcoal segregated in a separate mass or masses surrounded by or interleaved between layers of gum, instead of being intimately mixed therewith, the objectionable effect referred to may be avoided.

In Figure 1 we have shown a stick of chewing-gum consisting of alternate layers of chicle or other gum base (a) and of charcoal (b) with layers of gum on the outside. The charcoal may be in powdered form and may be mixed with some adhesive substance or binder, as sugar or honey or other binder dissolvable in the saliva of the mouth during the chewing operation, this binder being of course an edible substance, i. e., a substance which may be swallowed with the saliva and the charcoal whether nutritious or not. Such a composite preparation can be made by first spreading the gum in a sheet, then spreading thereon alternate layers of gum and charcoal and subsequently cutting the stratified sheet so formed into pieces of the desired size.

In Figure 2 we have shown a cylindrical piece of the gum-charcoal product formed by rolling together a layer of gum with a layer of charcoal, the completed product consisting of alternating spiral sheets of charcoal and gum.

In Figure 3 we show a product consisting of a cylindrical core (e) of charcoal surrounded by a sheet (f) of chicle or other gum. The finished product may, of course, take a wide variety of forms, it being essential in this form of our invention merely that the charcoal remain in a segregated mass or masses surrounded by but not intimately mixed with the gum.

We have found that when the charcoal and chicle or other gum are kept in segregated masses the product when subjected to the action of the teeth immediately assumes the proper consistency for chewing even though the charcoal be present in a quantity that, intimately mixed with the gum, would produce a hard mass unsuitable for use as a chewing-gum. The objectionable hardening of the product resulting from intimately mixing a relatively large amount of powdered charcoal with chicle or certain other gums may result from the gum saturating and entering the pores of the minute particles of charcoal and hardening or setting within and around these particles in so intimate contact therewith as to render it impossible to reduce the product to a plastic mass without an amount of pressure and kneading by the teeth that renders it unsuitable for chewing-gum. Whatever the cause may be of the hardening produced by intimately mixing large amounts of charcoal with chicle we have found that this objectionable effect is completely avoided by keeping the charcoal and gum in segregated masses as above described, the reason probably being that the relatively large segregated mass of charcoal is free from the cementing action of the chicle and that the chicle and the charcoal each retains in the completed product its original properties.

We have also discovered that it is possible to prepare a gum base from materials that will not be hardened to an objectionable extent by the intimate admixture therewith of a relatively large proportion of powdered charcoal. Paraffin, for instance, may be used as the gum base. When so used without the admixture of other substances to "shorten" or harden it the product is softer and less resistant than the gums now produced from chicle and allied substances, and a large proportion of powdered charcoal may be intimately mixed with paraffin without rendering it too hard or otherwise impairing its suitability for use in chewing-gum. Our invention may therefore be utilized in the form of an intimate mixture of powdered charcoal with paraffin or a substance having similar properties, or, if desired, the charcoal may exist in segregated masses inclosed in such a gum either mixed or not mixed with charcoal.

Broadly stated our invention consists in embedding in a chewing-gum base an amount of charcoal sufficient to have practical effect as a therapeutic agent and to render this possible by so distributing the charcoal and gum base in segregated masses in the completed product or using a gum base having such properties that the intimate admixture of a relatively large proportion, say two per cent. by weight or over, of charcoal does not harden or otherwise impair the product as a chewing-gum.

The therapeutic properties of charcoal are well known, but it is an inconvenient remedy to take either as a powder or in tablet form. The dry particles of charcoal cannot be swallowed, and while being chewed and remaining in the mouth to become mixed with sufficient saliva to make deglutition possible the minute particles of charcoal lodge upon and in the spaces between and around the teeth and gums producing an unpleasant sensation and appearance. But when taken in the form of the charcoal chewing-gum herein described the dry particles of charcoal do not become separated from the composite mass of gum and charcoal until they are carried off and swallowed in suspension in the saliva. The tendency of the charcoal to lodge about the teeth and other parts of the mouth is thereby avoided and any charcoal that may so lodge is immediately removed by the rubbing action of the gum while being chewed. All but a minute proportion of the charcoal becomes separated from the gum in the act of chewing and is swallowed, but the small amount remaining with the gum imparts to it a coal black color.

We claim:

1. An article of manufacture comprising segregated masses of chewing gum and of a mixture of powdered charcoal with a binder, said binder when dry and at ordinary temperatures being relatively rigid but when moist and at mouth temperature being yieldable and non-rigid, whereby when said article is subjected to the mechanical action of the teeth the charcoal and chewing gum form a yieldable mass from which charcoal gradually separates.

2. An article of manufacture comprising a mass of chewing gum forming an external casing and an interior segregated mass of an admixture of charcoal and a binder, said binder being relatively rigid at ordinary temperatures and when dry but non-rigid and yieldable at mouth temperature and when moist, whereby when subjected to the mechanical action of the teeth the gum and charcoal form a yieldable mass from which charcoal gradually separates.

3. An article of manufacture comprising a plurality of relatively thin segregated layers, the outer layers consisting of chewing gum and an interior intervening layer comprising a mixture of powdered charcoal and a binder, said binder being relatively rigid at ordinary temperatures and when dry but non-rigid and yieldable at mouth temperature and when moist, whereby when subjected to the mechanical action of the teeth the gum and charcoal form a yieldable mass from which charcoal gradually separates.

In testimony whereof, we have subscribed our names.

WALTER A. SCOTT.
KENNETH A. PROUTY.